United States Patent [19]

Gupta

[11] 4,373,033

[45] Feb. 8, 1983

[54] BLENDED PLASTOMERIC AND ELASTOMERIC RUBBER LATEX SPONGE

[75] Inventor: Ramesh K. Gupta, Toronto, Canada

[73] Assignee: Clarex Manufacturing Limited, Weston, Canada

[21] Appl. No.: 289,214

[22] Filed: Aug. 3, 1981

Related U.S. Application Data

[63] Continuation of Ser. No. 171,910, Jul. 21, 1980, abandoned, which is a continuation of Ser. No. 935,231, Aug. 21, 1978, abandoned.

[30] Foreign Application Priority Data

Apr. 11, 1978 [CA] Canada .................................. 300917

[51] Int. Cl.³ .............................................. C08V 9/30
[52] U.S. Cl. ..................................... 521/70; 428/95; 521/71; 521/139; 521/140
[58] Field of Search ................... 521/70, 71, 139, 140

[56] References Cited

U.S. PATENT DOCUMENTS

| | | | |
|---|---|---|---|
| 3,238,172 | 3/1966 | Talalay et al. | 521/70 |
| 3,300,421 | 1/1967 | Merriman et al. | 521/70 |
| 3,457,201 | 7/1969 | Smith et al. | 521/70 |
| 3,493,523 | 2/1970 | Fox et al. | 521/70 |
| 3,737,488 | 6/1973 | Porter et al. | 521/70 |
| 3,948,822 | 4/1976 | Wietsma | 521/70 |

FOREIGN PATENT DOCUMENTS 537910  3/1957  Canada ................................... 521/70

*Primary Examiner*—Morton Foelak
*Attorney, Agent, or Firm*—Spencer & Kaye

[57] ABSTRACT

The manufacture of foam rubber having improved set and deflection properties at low foam densities is provided.

10 Claims, No Drawings

BLENDED PLASTOMERIC AND ELASTOMERIC RUBBER LATEX SPONGE

CROSS-REFERENCE TO RELATED APPLICATIONS

This application is a continuation of application Ser. No. 171,910 filed July 21st, 1980, now abandoned, which is a continuation of application Ser. No. 935,231, filed Aug. 21st, 1978, and now abandoned.

BACKGROUND OF THE INVENTION

This invention relates to frothed rubber latex sponge. More particularly this invention relates to blending synthetic and natural latices with a high styrene resin latex augmentation to produce foamed sponges having densities below about 16 pounds and preferably below 8 pounds per cubic foot. This invention also relates to a process for producing frothed sponge rubber at very low densities yet retaining compressive deflection and compressive set so that the product is suitable in such sponge usages as upholstery cushions, shoe insoles, carpet backing or underlayment and the like.

Froth sponge rubber, broadly speaking, has been produced by converting latex into a foam, shaping the foam, coagulating and curing the latex in the foam as by the well known No-Gel system of the literature to form a highly useful material of commerce.

An important property of froth sponged rubber for such usages is its ability to resist compression load to the proper degree. This is measured as the amount of load necessary to produce a 25% (of the original thickness) deflection or compression in the latex sponge product. This property is developed into a standard method of measurement and values for particular uses under American Society for Testing and Materials (ASTM) Standard No. D1056 and Canadian Government Specifications Board (CGSB) Standard 20GP23a. In general, to achieve a high compression resistant sponge, the density of the sponge is kept high by beating less air into the latex; and in low compression resistant sponge density is kept low by beating more air into the latex. Since for high density more rubber is used in the high compression resistant sponge, its cost is correspondingly higher. Thus, sponge rubber may be sold on a compressive deflection/weight basis. It would be highly desirable to develop a sponge material which has the same compressive deflection value as conventional sponges, but produced with a lesser amount of rubber latex. One such thought on doing this has been to blend the natural rubber with a high styrene latex such as taught in Canadian Pat. No. 537,910. In practice, however, the industry for cushions and undercushions has not appeared to go beyond about a 5% by weight addition or augmentation with high styrene latex because the high styrene latex above 5% by weight addition is known to create surface imperfections such as surface cracking and a "crows feet" appearance, and kills certain other properties of the blended latex sponge most importantly the ability of the blend to resist compressive set.

Resistance to compressive set is the ability of the sponge to not take a permanent set after application of a specific compression and release of the compression. This is a characteristic of the sponge to retain its liveliness or spring-back after a specific compression of the sponge. In essence, after a standard compression has been applied under standard conditions and then released, the sponge returns only part way back to its original shape. This property also has been made the subject of a standard under ASTM Standard No. D1056 and CGSB Standard 20GP23a. Again, also, natural rubber is known for its resistance to compressive set, and augmentation with synthetic resin latices generally directly proportionally killed the compressive set resistance. Again, it would be highly desirable to be able to develop a blended sponge material which has the same compressive set values as conventional sponge, but produced with a lesser amount of rubber latex.

Canadian Pat. No. 537,910 establishes that it is possible to blend natural rubber with synthetic resin latices with sponging of the resulting blend to obtain low foam densities, though the natural rubber latex has to be matured for 16 hours before the resin latex addition. More particularly, the patent discloses a foamable latex mixture of natural rubber and a styrene-butadiene resin latex having as much as 95% styrene, wherein the resin latex may be present in amounts up to about 30% and the resulting foams will have densities around 8 pounds per cubic foot. Such material as taught by that patent does obtain desirable compressive deflection properties; however, the high amount of styrene augmentation has completely killed compressive set characteristics as to ASTM specifications and Canadian government specifications for cushions and the like. While it is known that generally various synthetic elastomeric latices may be blended with natural rubber for producing latex sponge rubber, these generally produced products are not suitable for undercushion usage because of compressive deflection and compressive set characteristics which are only obtained at high densities, around 12 pounds per cubic foot or higher. Trials to produce densities below 10 pounds per cubic foot in styrene butadiene latices, even with high styrene augmentation in amounts of only 5-10 dry parts per 100 dry parts of elastomeric latex by weight, produced products deficient in physical properties such as compressive sets. It is believed by those skilled in the art that the addition of more than 5 dry parts of high styrene latex per 100 dry parts of elastomeric latex would make it necessary to keep densities in the 12-20 pounds per cubic foot range, dependent upon the use of the product, to maintain acceptable compressive set values and surface appearance because of the greater stiffness introduced by the high styrene. That is, generally the industry accepts that densities must be at least between 15-20 pounds for pillow cushioning, 16-18 pounds for carpet backing and 12-14 pounds for undercushion of acceptable compressive set values for example.

Also, for example, U.S. Pat. No. 3,573,246 teaches a process of modifying natural rubber with a synthetic reinforcing latex in which the blend is homogenized to achieve the blending for latex foam goods. This operation must be done under pressure and temperature conditions by the manufacturer as part of the polymerization process. The manufacturer of foam undercushion goods has neither the equipment nor the expertise to get into the polymerization business and is confined to using available commercially polymerized materials in his processes. In somewhat similar fashion, British Pat. No. 1,383,642 uses hydrazine and hydrogen peroxide to produce the requirements of low density and good deflection in a modified polymer dispersion. This patent does not set forth any mention of effect on compressive set. Again, this procedure is more appropriate for the manufacture of the latices and not for the manufacture of the sponge rubber articles.

SUMMARY OF THE INVENTION

The principal object and advantage of the present invention is the use of a blend of natural and synthetic elastomeric and synthetic plastomeric latices so as to obtain a frothed sponge rubber of low density while retaining both high compressive deflection and low compressive set characteristics, and while retaining acceptable surface appearance and quality such as no surface cracking as is normally known to those skilled in the art to occur when more than 5% by dry weight of synthetic plastomeric latex is used in the blend.

Another object is the provision of a blending process and the capability of instant use of the blend to produce a low density foam without any maturation period or homogenizing process or any other special treatment, while retaining both compressive sets and compressive deflection properties.

A further object is the provision of a process for blending commercially available latices so as to produce a frothed sponge rubber of very low densities yet retaining high compressive deflection and low compressive set.

Still another object is the provision of forthed rubber latex sponge of low densities, ranging down from about 16 pounds per cubic foot, while maintaining compressive sets of less than 20%.

Canadian Pat. No. 537,910 found that a low density frothed sponge rubber of high compressive deflection could be obtained by adding a single resin latex to the rubber latex after the rubber latex (natural latex) had matured for 16 hours and then sponging the resultant blend.

The fulfillment of the above and other objects and advantages of the present invention are accomplished, it has been discovered, by augmenting a conventional elastomeric synthetic rubber latex base for frothing to sponge rubber articles with both a plastomeric latex and an elastomeric latex so as to present for frothing a blend of, for example, from 5–25 dry parts each of high styrene resin and natural rubber per 100 dry parts of elastomeric butadiene-styrene resin. In one particular preferred embodiment a foam carpet underlay/undercushion that has actual foam densities below about 8 pounds per cubic foot and both resiliency and stiffness required for undercushion was prepared by blending a natural rubber latex and a high styrene latex as augmenting latices to a styrene butadiene elastomeric base latex that contained 150 parts augmenting filler per 100 parts by dry weight latex solids based on the blended latex and the usual ingredients found in any No-Gel latex formulation; frothing the latex to produce a foam, shaping the foam, coagulating the latex in the foam and curing the latex. The latex blend contained 65 parts styrene butadiene rubber, 20 parts high styrene resin and 15 parts natural rubber on parts by dry weight.

DESCRIPTION OF THE PREFERRED EMBODIMENTS

The base elastomer latices employed in the process of the invention are broadly described as elastomeric aqueous dispersions of natural or synthetic rubber. By synthetic rubber is meant homopolymers of butadiene or isoprene; copolymers of butadiene and styrene, butadiene and acrylonitrile, isoprene and styrene, copolymers of butadiene, styrene and an unsaturated carboxylic acid; and chloroprene homopolymers. Preferred are the emulsion-polymerized copolymer latices of butadiene and styrene having less styrene content that butadiene content (SBR latcies) that are commerically available articles of commerce such as a 30/70 styrene butadiene SBR available from various commercial sources under various trade names such as POLYSAR 730, and Goodyear Pliolite 4443.

The preferred augmenting plastomeric latex of the invention is the so called "high styrene resins" of commerce which are styrene-butadiene copolymers having a styrene content in excess of 70% by weight. In similar fashion, any commercially available latices which are elastomeric by definition under ASTM D 883-65T and provide stiffening may be used such as acrylic latices and vinyl latices such as the stiff vinyl acetate latices.

The preferred augmenting elastomeric latices employed in the process of the present invention may be broadly described as aqueous dispersions of natural or synthetic rubber that are elastomeric within the definition of ASTM D 883-65T when cured. The preferred augmenting elastomeric latex are any commercially available natural rubber latices. But any augmenting latices such as latices having elongation characteristics such as polybutadiene and polyisoprene latices may satisfactorily be utilized in the practice of the present invention.

The improved low density sponge-like compositions of the invention are made by the methods now in use for making frothed rubber latex sponge. The latex and the two augmenting latices may be added to each other in any order. The mixtures of natural and synthetic plastomer and elastomer latices are prepared with sufficient quantities of customary stabilizing agents for the purpose of retaining latex solids particles in suspension throughout the compounds operation. Conventional compounding aids such as thickening agents, conventional anti-oxidants, conventional accelerators, pigments and modifying agents for improving the appearance of the composition may be included in their customary amounts, generally about 10 to about 40 parts per 100 parts of latex solids, for their known properties. Conventional fillers generally in amounts of 100 to 200 parts per 100 parts of latex solids may also be included.

By trying various combinations of SBR/high styrene/natural latex blends at a constant frothing time, it was found that both resiliency and stiffness properties necessary for commercial products could be obtained while maintaining densities below 8 pounds per cubic foot when the parts by weight of latex solids in the blended latice was in the range of about 5–25 dry parts augmenting plastomeric latex such as 70/30 high styrene resin latex; 5–25 dry parts of augmenting elastomeric latex such as natural rubber latex; and 90–50 dry parts base elastomer latex such as 30/70 styrene butadiene rubber latex. A most particularly preferred latex blend at the present time is around 20 parts by dry weight high styrene resin and 15 parts by dry weight natural rubber added to 85 parts dry weight SBR standard base latex containing 150-200 parts dry weight conventional compounding aids including filler.

The following examples will illustrate various specific embodiments of the compositions and process of the present invention. It is understood that the examples are by way of illustration and not to be construed as limitations on the present invention.

EXAMPLES

In a comparative evaluation to Canadian Pat. No. 537,910 a series of formulations according to the present invention were prepared and evaluated for compressive sets and compressive deflection. It is noted that the value of compressive deflection and compressive sets reported herein are considerably different in numerical values from those set forth in the Canadian patent and the compressive set and deflection by ASTM 1056 test method are set forth in the Table. In the second portion of the evaluation, (right side of the Table) a corresponding formulation in the same percentages of total resin latex/rubbery latex for blended latices are set forth for compositions of the present invention along with their compressive set and deflection values.

TABLE I

| | FORMULATION | CANADIAN PATENT 537,910 | | | PRESENT INVENTION | | |
|---|---|---|---|---|---|---|---|
| Example | Dry Weight Ratio High Styrene/ Natural/Rubbery SBR | Foam Density lbs. per cu. foot | Comp/Def. lbs. per sq. inch | Comp/Set % Thickness Loss | Foam Density lbs. per cu. foot | Comp/Def. lbs. per sq. inch | Comp/Set % Thickness Loss |
| Control | 0/100/0 | 8.05 | .72 | 10% | | | |
| | 0/0/100 | | | | 11.63 | 1.563 | 10.13% |
| #1 | 5/95/0 | 7.53 | .76 | 14.4% | | | |
| | 5/10/85 | | | | 9.12 | 1.425 | 13.0% |
| #2 | 10/90/0 | 7.03 | .82 | 25.2% | | | |
| | 10/15/75 | | | | 8.00 | 1.313 | 13.0% |
| #3 | 15/85/0 | 7.36 | 1.13 | 23.4% | | | |
| | 15/15/70 | | | | 7.79 | 1.625 | 13.5% |
| #4 | 20/80/0 | 7.344 | 1.82 | 54% | | | |
| | 20/15/65 | | | | 7.57 | 1.938 | 16.5% |
| #5 | 25/75/0 | 6.84 | 2.72 | Not Reported | | | |
| | 25/20/55 | | | | 6.99 | 2.15 | 15.5% | values from those set forth in the Canadian patent. The Canadian patent utilizes an older test for compressive set and compressive deflection which reported the values for compressive set as percent thickness retained after removal of compression, and deflection values were reported as the load needed to compress a circular area of 50 square inches of foam to 75% of its original thickness. The values set forth herein are according to ASTM 1056, 1055 and CGSB 20GP23a wherein the numerical values reported for compressive sets are for percentage reduction in thickness (based on 50% compression of the foam) after removal of the compression. The numerical values reported for compressive deflection are in pressure units for a compression of 25% of the original specimen thickness.

In each of the examples, the compressive deflection value is obtained by determining the weight in pounds necessary to compress a square area of 4 square inches of sponge to 75% of its original thickness and expressing the load in pounds per square inch. The compressive set is obtained by calculating the percent loss in thickness of a 2 inch square sample by the following formula:

Compressive set = $100 \times (t_o - t_f)/(t_o - t_s)$

Where
$t_o$ = original thickness of the test specimen
$t_f$ = thickness of test specimen after it has been compressed to 50% of its thickness for 22 hours at 158° F. and allowed to expand for ½ hour at room temperature
$t_s$ = thickness of the spacer bar used (50% of original thickness of the test specimen)

Canadian government specification 20GP23a for undercushion requires compressive set values of less than 20% and compressive deflection values of more than 1 p.s.i. under ASTM 1056 test methods. In essence, the data provided from the Canadian Pat. No. 537,910 has been converted to the present test methods for a direct data comparison with the work of this present invention.

In the first portion of the evaluation (left side of the Table) a series of samples having the formulation of the Canadian patent were followed on proportioning the high styrene latex to the rubbery latex. Thus, in Example 3 of the Canadian patent, 85% of natural rubber latex was blended with 15% of the resin latex (styrene on dry resin basis) produced a sponge having an 88.3% "permanent set", which when converted to the ASTM measuring method results in a compression set of 23.4%. This value is too high to qualify for either chair, cushion or undercushion usage. The same proportions of styrene to rubbery latex were maintained using various formulations of the present invention; however, by proportioning the amount of styrene butadiene rubber to natural rubber at all percentages of high styrene augmentation set forth in the Canadian patent, formulations were made having the same proportion of rubbery latex but which met the compression set standards for undercushion and seat cushion. That is again, utilizing a mix of styrene to rubbery latex set forth in Example 2 of the Canadian patent, a blend of 10% styrene resin latex was blended with a mixture of 75% styrene butadiene rubber latex and 15% natural rubber latex to achieve a compressive deflection of 1.3 and a compressive set of 13%. Thus in each of the Examples 2–5 of the Canadian patent wherein the amounts of styrene from 10–25% augmentation killed compression set, proportioning the SBR and natural rubber latices of the present invention maintained values within the acceptable range of this important property.

Note that in Example 1 and Control in the present invention portion of the Table the density of foam is above 8 lbs. per cubic foot. This was done deliberately to meet the compressive deflection values as dictated by Canadian government standard 20GP23a. Lowering of density of Example 1 and control of the present invention to below 8 lbs/cu.ft. would have simply lowered the compressive deflection values to below 1 p.s.i. with no effect on compressive set values as is well known to those skilled in the art and is also evident from Example 1 and Control of the Canadian patent which has the compressive deflection value of below 1 p.s.i. for density around 8 lbs/cu.ft.

One ordinarily skilled in the art following the teachings of the Canadian patent as to the values obtained with his specific examples using natural rubber would not be reasonably led to believe that the proportioning between rubbery latices would cause such a drastic turn around in the important physical property of compressive set. While the Canadian patent indicates that his rubbery latex is intended to include mixtures of natural and synthetic rubber latices there is nothing on face which would lead one of ordinary skill to believe that such a drastic turn around in compressive set properties could be achieved by making particular proportioning of natural latex and a particular synthetic rubber latex.

As can be seen from the Table, formulations according to the Canadian patent would appear devoid of satisfactory compressive set properties above when more than 5 parts of high styrene is added to the formulation; and would result in "crows feet" surface cracking in the samples. In contrast, up to 25 parts of high styrene augmentation to the formulation may be made according to the present invention while easily meeting the compressive set standards at around or below 8 lbs. per cubic foot foam density.

What is claimed is:

1. A frothed sponge rubber having a density between 2 and 20 pounds per cubic foot of blended natural and synthetic elastomeric latices and synthetic plastomeric latex characterised in containing more than 5 parts by weight styrene on a dry solids weight basis and in exhibiting high compressive deflection of more than about 1 psi and low compressive set of less than about 20% which comprises, by weight:
   about 90–50 parts of base elastomeric latex solids selected from the group consisting of (1) homopolymers of butadiene; (2) homopolymers of isoprene; (3) copolymers of butadiene and styrene having less styrene content than butadiene content; (4) copolymers of butadiene and acrylonitrile; (5) copolymers of isoprene and styrene; (6) copolymers of butadiene, styrene and an unsaturated carboxylic acid; (7) homopolymers of chloroprene; and (8) natural rubber;
   about 5–25 parts of augmenting plastomeric latex solids, selected from the group consisting of styrene-butadiene copolymers having a styrene content of at least 70% by weight, acrylic latices and vinyl latices, and exhibiting stiffening as defined under ASTM D 833-65T;
   and about 5–25 parts of augmenting elastomeric latex solids, the augmenting elastomeric solids being chemically different from the base elastomeric latex solids and being elastomers within the definition of ASTM D 833-65T when cured, at least one of said base elastomeric latex solids and said augmenting elastomeric latex solids containing natural rubber latex,
   wherein said frothed sponge rubber is produced by a no-gel method.

2. The frothed sponge rubber of claim 1 having a density below about 16 pounds per cubic foot and exhibiting compressive deflection above 1 pound per square inch and compressive set below 20% thickness loss.

3. The frothed sponge rubber of claim 1 having a density below about 8 pounds per cubic foot and exhibiting compressive deflection above 1 pound per square inch and compressive set below 20% thickness loss.

4. The frothed sponge rubber of claim 1 in which the base latex is styrene-butadiene rubber latex; the augmenting elastomeric latex is natural rubber; and the augmenting plastomeric latex is high styrene resin SBR latex.

5. The frothed sponge rubber of claim 1 containing about 20 parts by weight of high styrene resin latex solids; about 15 parts by weight of natural rubber latex solids; and about 85 parts by weight of styrene-butadiene rubber latex solids.

6. A sponge undercushion produced by a no-gel method, comprising about 5–25 parts by weight of high styrene resin SBR latex solids; about 5–25 parts by weight of natural rubber latex solids; and about 90–50 parts by weight of styrene-butadiene rubber latex solids.

7. A sponge carpet backing produced by a no-gel method, comprising about 5–25 parts by weight of high styrene resin SBR latex solids, about 5–25 parts by weight of natural rubber latex solids; and about 90–50 parts by weight of styrene-butadiene rubber latex solids.

8. A no-gel method for producing a frothed sponge rubber having a density between 2 and 20 pounds per cubic foot of blended natural and synthetic elastomeric latices and synthetic plastomeric latex characterised in containing more than 5 parts by weight styrene on a dry solids weight basis and in exhibiting high compressive deflection of more than about 1 psi and low compressive set of less than about 20% which comprises:
   preparing a first compounded aqueous rubber latex dispersion containing about 90–50 parts by weight of base elastomeric latex solids and comprising a latex selected from the group consisting of (1) homopolymers of butadiene; (2) homopolymers of isoprene; (3) copolymers of butadiene and styrene having less styrene content than butadiene content; (4) copolymers of butadiene and acrylonitrile; (5) copolymers of isoprene and styrene; (6) copolymers of butadiene, styrene and an unsaturated carboxylic acid; (7) homopolymers of chloroprene; and (8) natural rubber;
   admixing with the first latex dispersion (a) about 5–25 parts by weight latex solids of a dispersion of a plastomeric latex that is selected from the group consisting of styrene-butadiene copolymers having a styrene content of at least 70% by weight, acrylic latices and vinyl latices, and that exhibits stiffening as defined under ASTM D 883 and (b) about 5–25 parts by weight latex solids of an augmenting elastomeric latex dispersion, the augmenting elastomeric latex solids being chemically different from the base elastomeric latex solids and being elastomers within the definition of ASTM D 883-65T when cured, at least one of said base elastomeric solids and said augmenting elastomeric solids containing natural rubber latex;
   frothing the admixture to produce a foam having a density between 2 and 20 pounds per cubic foot;
   shaping the foam;
   coagulating the latices in the shaped foam;
   and curing the coagulated foam to a frothed sponge rubber.

9. The method of claim 8 in which the first latex dispersion is styrene-butadiene rubber latex; the augmenting plastomeric latex is high styrene resin SBR latex; and the augmenting elastomeric latex is natural rubber latex.

10. The method of claim 8 in which the admixture comprises about 85 parts styrene-butadiene rubber, about 20 parts high styrene resin SBR latex and about 15 parts natural rubber on a parts by weight latex solids basis.

* * * * *